July 1, 1924.

W. C. STEVENS

CLUTCH MECHANISM

Filed Dec. 31, 1920

1,499,419

Inventor
William C. Stevens
By Frank H. Hubbard
Attorney

Patented July 1, 1924.

1,499,419

UNITED STATES PATENT OFFICE.

WILLIAM C. STEVENS, OF MILWAUKEE, WISCONSIN, ASSIGNOR TO THE CUTLER-HAMMER MFG. CO., OF MILWAUKEE, WISCONSIN, A CORPORATION OF WISCONSIN.

CLUTCH MECHANISM.

Application filed December 31, 1920. Serial No. 434,202.

*To all whom it may concern:*

Be it known that I, WILLIAM C. STEVENS, a citizen of the United States, residing at Milwaukee, in the county of Milwaukee and State of Wisconsin, have invented new and useful Improvements in Clutch Mechanisms, of which the following is a full, clear, concise, and exact description, reference being had to the accompanying drawing, forming a part of this specification.

This invention relates to variable speed transmissions and more particularly to clutch mechanisms therefor.

My prior application, Serial No. 420,934, filed Nov. 1, 1920, discloses several variable speed transmission mechanisms each including a friction clutch, and a positive clutch, the latter being releasable upon release of the former to facilitate speed changing operations.

The present invention has among its objects to provide a unit form of transmission wherein the positive clutch serves as a coupling between the driven element of the friction clutch and its shaft, said clutches being associated for release in a given order and for re-engagement in a reverse order.

Another object is to provide a unit of the aforesaid character wherein the driven element of the friction clutch is releasably connected to its shaft through the medium of a jaw coupling which is so constructed that its members may be readily engaged when operating at widely varying speeds.

Another object is to provide a double clutch of the aforesaid character having operating means for releasing the jaw clutch following release of the friction clutch and for insuring substantially instantaneous re-engagement of the jaw clutch prior to resetting of the friction clutch.

Various other objects and advantages of the invention will hereinafter appear.

The accompanying drawing illustrates an embodiment of the invention which will now be described, it being understood that the embodiment illustrated is susceptible of various modifications without departing from the scope of the appended claims.

Figure 1:
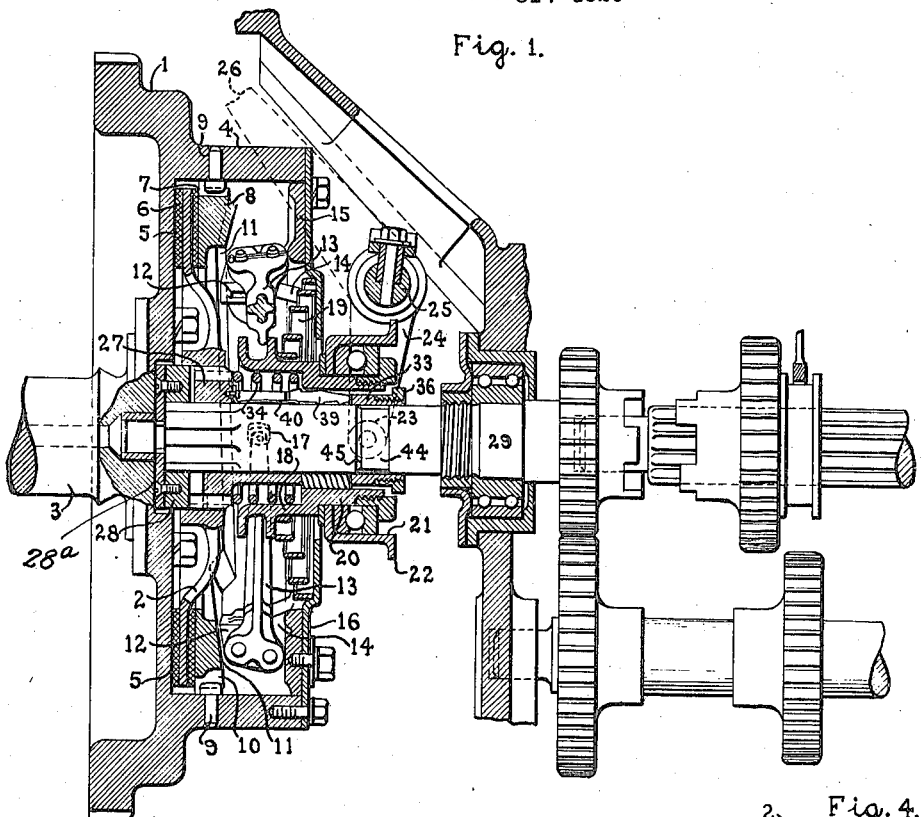
Fig. 1 is a sectional view of a unitary friction clutch embodying the invention.

Referring to Fig. 1, the same illustrates a known type of friction clutch including driving and driven members 1 and 2, the former being secured to a shaft 3 and being provided with an annular flange 4 and a friction surface 5. The member 2 comprises a disc arranged within member 1 and provided with friction surfaces on opposite faces thereof, an annular friction ring 6 of asbestos or other suitable material being interposed between friction surface 5 of member 1 and the adjacent face of member 2 while a similar friction ring 7 is interposed between the opposite face of member 2 and an annular thrust ring 8. Thrust ring 8 is movable axially within the annular flange 4 of member 1 but is held against rotation relatively thereto by a plurality of pins 9 which are driven into openings in said flange and project inwardly into transverse slots 10 in the periphery of said ring. Thrust ring 8 has its right face shaped to provide a plurality of thrust seats 11 which are inclined from the inner to the outer edge of said ring and are adapted to receive thrusts from associated thrust blocks 12 carried by a plurality of operating levers 13. Operating levers 13 are pivotally secured to lugs 14 on an annular member 15 and the latter is secured to an annular cover plate 16 secured to the end of flange 4. Each of the operating levers 13 has an inwardly extending arm provided with a roller 17 which projects into a circumferential recess in a retractor collar 18. Retractor collar 18 is biased towards the left by a coil spring 19 located between the same and plate 16, and said collar is provided with a projecting sleeve 20 having a throwout cup 21 rotatably mounted thereon. Throwout cup 21 is provided with a projecting flange 22 to be engaged by rollers 23 carried by an operating fork 24, and said operating fork is connected by a shaft 25 to the usual clutch operating lever 26, part of said lever being shown in dotted lines in Fig. 1.

From the foregoing it is apparent that under the action of spring 19 retractor collar 18 is biased towards the left to force thrust blocks 12 outwardly across their respective thrust seats 11. Under the action of thrust blocks 12, thrust ring 8 is forced towards the left to clamp friction rings 6 and 7 between the faces on opposite sides thereof for frictional connection of driven member 2 with driving member 1. Upon depression of operating lever 26, retractor collar 18 is moved towards the right against the action of spring 19 and carries operating levers 13 therewith to move thrust blocks 12 inwardly across thrust seats 11 for release of driven member 2.

Figure 2:
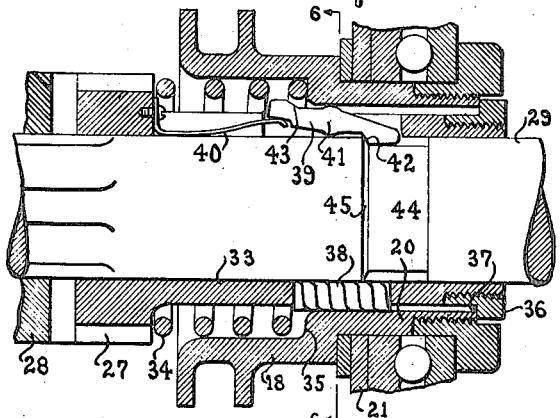
Fig. 2 is an enlarged sectional view illustrating certain of the clutch parts in their released position.
Figure 3:
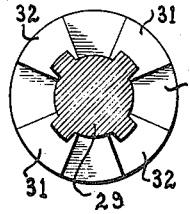
Figs. 3, 4 and 5 are detail views of certain of the clutch parts shown in Fig. 2; and, Fig. 6 is a sectional view on line 6—6 of Fig. 2.
Figure 4:
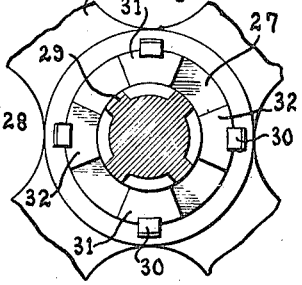
Figure 5:
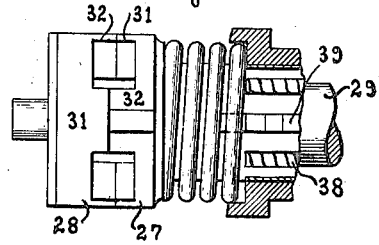
Figure 6:
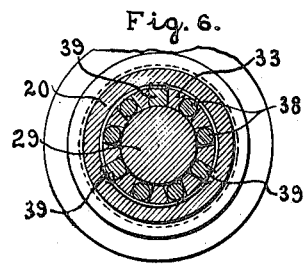

Driven member 2 is bored to receive a jaw member 27 which co-operates with a jaw member 28 to releasably connect said driven member to a shaft 29. Jaw member 28 is provided with keyways to receive keys formed on the left hand end of shaft 29 and the same is held against axial movement on said shaft by a collar 28ª fixed thereto and interposed between the end of shaft 3 and a shoulder formed on the left hand end of shaft 29. Jaw member 27 is loose on shaft 29 and is slidably keyed to driven member 2 by a plurality of keys 30. The adjacent faces of jaw members 27 and 28 are formed to provide a plurality of interfitting jaws and as shown in Figs. 3, 4 and 5 the alternate jaws 31 of each of said members are made shorter than the intermediate jaws 32 thereof for a purpose hereinafter set forth. Jaw member 27 is provided with a sleeve 33 which projects through the bore in sleeve 20 of retractor collar 18 and the same is biased towards the left by a spring 34 which is weaker than the spring 19 and which is interposed between said jaw member and a shoulder 35 in said retractor collar. Sleeve 33 carries an adjustable nut 36 having a shoulder 37 to be engaged by the outer end of sleeve 20 and the same is slotted to receive a plurality of rollers 38 for maintaining retractor collar 18 in centered relation with respect to shaft 29. Sleeve 33 is also slotted to receive a plurality of latches 39 which are located between shaft 29 and the bore of sleeve 20 and held against longitudinal movement with respect to said sleeve by engagement with the ends of said slots. The left end of each of the latches is biased outwardly by a leaf spring 40 secured to jaw member 27 and each of the same tends to rock under the action of its spring upon an enlarged bearing portion 41 intermediate its ends. Each of the latches is provided with a downwardly projecting shoulder 42 adjacent its right end and with an upwardly projecting shoulder 43 adjacent its left end. As by said recess to retain said jaw member in its released position. Also as shown in Fig. 2 when the latches drop into recess 44 the shoulders 43 assume positions wherein the same are projected into the path of shoulder 35 in the retractor collar 18.

Normally the retractor collar 18 is in the position shown in Fig. 1, the end of sleeve 20 being out of engagement with shoulder 37 of nut 36 to permit spring 34 to hold jaw member 27 in firm engagement with jaw member 28. Upon movement of retractor collar 18 towards the right to release the driven member 2, sleeve 20 engages shoulder 37 and carries jaw member 27 therewith out of engagement with jaw member 28. The jaws 32 on members 27 and 28 are of such length that after the clutch member 2 is released a slight additional movement of retractor collar 18 towards the right releases said members for disconnection of shaft 29 from driven member 2. As before stated upon release of jaw member 27 pawls 39 drop into recess 44 to retain said jaw member in its released position. Due to such retention of jaw member 27 retractor collar 18 moves relatively thereto in its return movement and compresses spring 34. Upon a given return movement of the retractor collar 18 the shoulder 35 thereof engages shoulders 43 of latches 39 to trip the latter whereupon jaw member 27 is released and moves into engagement with jaw member 28 with a snap action under the action of spring 34. As before stated, jaws 32 of members 27 and 28 are longer than the jaws 31 thereof and it should now be observed that when said members are forced together with the shorter jaws of one in alignment with the longer jaws of the other as shown in Fig. 5, the long jaws of the two members will upon subsequent relative rotation of said members engage to be readily interfitted. On the other hand when said jaw members are forced together with their longer jaws in alignment relative rotation of said members will either allow immediate interfitting of the jaws or will align the jaws of unequal length with the results above noted. The latches 39 are so designed that the same are tripped prior to resetting of the friction members 1 and 2, and following tripping thereof retractor collar 18 is returnable to normal position to effect resetting of said friction members.

What I claim as new and desire to secure by Letters Patent is:

1. In a clutch unit, in combination a friction clutch having driving and driven friction elements, the latter element having a central opening therein, a shaft rotatable the other being loose thereon, said latter jaw clutch member being arranged within the opening in said driven friction element and being splined thereto and common operating means for disengaging said friction clutch and said jaw clutch sequentially.

2. In a clutch unit, in combination, driving and driven friction elements the latter having a central opening therein, a shaft rotatable with respect to said latter element, a jaw coupling including co-operating jaw members one being fixed to said shaft and the other being loose thereon, said latter jaw member being arranged within the opening in said driven friction element and being splined thereto, a spring for moving said latter jaw member into engagement with the former, and operating means for effecting release of said jaw members following release of said friction elements said operating means providing for re-engagement of said jaw members under the action of said spring prior to re-engagement of said friction elements.

3. In a clutch unit in combination driving and driven elements the latter having a central opening therein, a shaft rotatable with respect to said latter element, a jaw coupling including co-operating jaw members one being fixed to said shaft and the other being loose thereon, said latter jaw member being arranged within the opening in said driven friction element and being splined thereto, common operating means for effecting release and engagement of said friction elements and said jaw members sequentially and means associated with said latter jaw member to provide for substantially instantaneous engagement thereof with said former jaw member prior to engagement of the friction elements.

4. A clutch unit including driving and driven friction elements, operating means therefor including an operating member movable in one direction to disengage said elements and in an opposite direction to effect re-engagement thereof, a shaft rotatable within said driven friction element, a coupling between said shaft and said driven element comprising cooperating jaw members, one being fixed to said shaft and the other being slidable thereon and operatively connected to said driven element, a spring for moving said latter jaw member into engagement with the former, and means for disengaging said jaw members against the action of said spring.

5. A clutch unit including driving and driven friction elements, operating means therefor including an operating member movable in one direction to disengage said elements and in an opposite direction to effect re-engagement thereof, a shaft rotatable within said latter friction element, a coupling between said shaft and said driven element comprising cooperating jaw members, one being fixed to said shaft and the other being slidable thereon and operatively connected to said driven element, a spring for moving said latter jaw member into engagement with the former, and a plurality of spring-pressed floating latches for holding said latter jaw member out of engagement with the former, said latches being subject to tripping upon a given return movement of said operating member to permit substantially instantaneous re-engagement of said jaw members preceding resetting of said friction elements.

6. In a power transmission device, in combination, driving and driven friction elements, a spring for normally effecting engagement of said elements, a shaft rotatable within said driven friction element, a coupling between said shaft and said driven element comprising cooperating jaw members one being fixed to said shaft and the other being loose thereon and operatively connected to said driven element, a spring for normally effecting engagement of said jaw members, and means for effecting disengagement of said friction elements and said jaw members in sequence against the action of said springs.

7. A clutch unit including driving and driven friction elements, operating means therefor including an operating member movable in one direction to disengage said elements and in an opposite direction to effect re-engagement thereof, a shaft rotatable within said latter friction element, a jaw coupling between said shaft and said driven element comprising a jaw member fixed to said shaft and a jaw member operatively connected to said driven element, an energy storing connection for moving said latter jaw member into engagement with the former and means associated with said latter jaw member for retracting the same from the former upon movement of said operating member in said former direction and for retaining the same in its retracted position subject to release upon a predetermined return movement of said operating member.

8. A clutch unit including driving and driven friction elements, operating means therefor, including an operating member movable in one direction to disengage said elements and in an opposite direction to effect re-engagement thereof, a shaft rotatable within said latter friction element, a coupling between said shaft and said driven element comprising co-operating jaw members one being fixed to said shaft and the other being slidable thereon and operatively connected to said driven element, a spring for moving said latter jaw member into engagement with the former and a latch for retaining said latter jaw member in its released position, said latch being subject to tripping upon a given return movement of said member to permit substantially instantaneous re-engagement of the former jaw member with the latter prior to resetting of said friction elements.

9. In a power transmission device, in combination co-operating jaw members, a shaft fixed to one of the same and rotatable within the other, an operating member movable in opposite directions to move said latter jaw clutch member into and out of engagement with the former, a latch for retaining said latter clutch member in its released position, said latch being adapted to be tripped by said operating member and a spring interposed between said latter jaw member and said operating member for imparting a snap to said latter jaw member upon tripping of said latch.

In witness whereof, I have hereunto subscribed my name.

WILLIAM C. STEVENS.